United States Patent
Salecker et al.

[19]

[11] Patent Number: 5,899,829
[45] Date of Patent: *May 4, 1999

[54] APPARATUS FOR CONTROLLING AUTOMATED ACTUATION OF TORQUE TRANSMITTING SYSTEM AND AUTOMATED GEAR SHIFTING AND METHOD FOR CONTROLLING AUTOMATED ACTUATION OF TORQUE TRANSMITTING SYSTEM AND AUTOMATED GEAR SHIFTING

[75] Inventors: Michael Salecker, Bühl; Jochen Stinus, Achern; Martin Zimmermann, Sasbach, all of Germany

[73] Assignee: Luk Getriebe-Systeme GmbH, Buhl/Baden, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/816,066

[22] Filed: Mar. 11, 1997

[30] Foreign Application Priority Data

Mar. 14, 1996 [DE] Germany .......................... 196 09 924

[51] Int. Cl.$^6$ .................................................. F16H 61/16
[52] U.S. Cl. ............................................. 477/78; 477/906
[58] Field of Search .................................. 477/77, 78, 79, 477/906

[56] References Cited

U.S. PATENT DOCUMENTS 5,537,894   7/1996   Chan .......................................... 477/78

FOREIGN PATENT DOCUMENTS 35 07 565   9/1986   Germany .
39 37 302   5/1991   Germany .

OTHER PUBLICATIONS

VDI Berichte Nr. 681, 1998, pp. 177–206; Schaltgetriebe—Synchronisation—Ford Prufkonzept Man. Transmission—Syschronisastion—Ford Test Strategy; Ing. W. Kehler, Dipl.–Ing W. Kahlke und; Dipl.Ing. H. Trenz, Koln.

Primary Examiner—Dirk Wright
Attorney, Agent, or Firm—Darby & Darby

[57] ABSTRACT

The present invention relates to an apparatus and a method for automated controlling of an engageable and disengageable torque transmitting system and of a shifting a transmission in a power drive of a propulsion unit of an automotive vehicle, having at least one actuator for gear shifting and for operating the torque transmitting system, and having a control unit for controlling the at least one actuator and, further, having at least one sensor connected in signal-transmitting communication with a control unit. The sensor is arranged to operate between the control unit and the transmission and to monitor conditions in the transmission during automated shifting and to detect a predetermined condition while the system is disengaged and, upon detection of such predetermined condition, to undo, at least temporarily and at least partially, the preceding gear shifting, and to thereafter resume gear shifting.

48 Claims, 5 Drawing Sheets

APPARATUS FOR CONTROLLING AUTOMATED ACTUATION OF TORQUE TRANSMITTING SYSTEM AND AUTOMATED GEAR SHIFTING AND METHOD FOR CONTROLLING AUTOMATED ACTUATION OF TORQUE TRANSMITTING SYSTEM AND AUTOMATED GEAR SHIFTING

BACKGROUND OF THE INVENTION

The present invention relates to apparatus for automated actuation of a torque transmitting system and for automated shifting of a transmission in a power train of a propulsion unit of an automotive vehicle, having one or more actuators for gear shifting and for operating the torque transmitting system, and having a regulating or control unit for regulating or controlling the actuator(s) and, further, having one or more detection devices (such as one or more sensors) in signal-transmitting communication with a regulating or control unit.

Further, the invention relates to a method of operating an automated actuation of a torque transmitting system and of automated gear shifting by controlling one or more actuators for gear shifting and for operating the torque transmitting system.

Automated actuation of a torque transmitting system and of automated gear shifting serve the automation of transmissions with discrete gear ratios, and torque transmitting systems (such as clutches) in the power train. Automated shift transmissions generally are shift transmissions which can be manually shifted with a conventional linkage, but the articulation of the gear shifting can also be accomplished automatically by an actuator. Such transmissions can be so equipped that during the gear shifting process, the existing traction force is interrupted. This differs from conventional automatic transmissions in that the conventional transmissions essentially operate without interrupting the traction force during gear shifting. Conventional transmissions of this type are disclosed, e.g., in DE-OS 39 37 302 and DE-PS 35-07 565.

Compared with the conventional fully automatic automobile transmission with hydraulic torque converter and planetary gears, the automated actuation of the torque transmitting system and of the transmission, offers advantages in that the transmission can be a non-modified or slightly modified manual shift transmission. In a non-modified or slightly modified manual shift transmission, the conventional linkage for translating the shift lever movement to a manual gear shifting utilizes at least one actuator in order to automatically shift the transmission with the control unit. The actuator can be disposed within or on the outside of the transmission. Furthermore, a cylinder cam actuator, although more expensive, can also be installed within the transmission.

When gear shifting is initiated, either by a signal given by the power or by a signal given by the regulating or control unit, the torque transmitting system is at least partly disengaged by the control unit. Thereafter, the control unit causes the actuator to shift the gears or to actuate internal transmission gear shifting elements, i.e., a force generated in the actuator by the control unit moves internal transmission gear shifting elements either into active contact, or it prevents the active contact, or it causes both contact conditions to take place sequentially. The latter causes gear shifting from one gear ratio to the next gear ratio. After the gear shifting is completed, the torque transmitting system is again engaged. The actuator can be designed to provide any shifting sequence.

Generally, a synchronization device includes a synchronization ring and a coupling element and is disposed between the internal transmission gear shifting elements. These internal transmission gear shifting elements may have a toothed construction. The synchronization device provides for a rotational speed synchronization before a meshing of the individual internal gear shift elements takes place and, upon obtaining a synchronized rotational speed, it provides for an active contact through the gear meshing between the internal gear shift elements. In the majority of the gear shiftings, either done manually or by controlled actuation utilizing an actuator, the internal gear shift elements mesh without a problem. However, for a small but significant number of gear shiftings, the positioning of the gear shifting elements may be such that, e.g., top lands of the toothed constructions collide with one another during shifting, creating excessive forces. This may cause damage to the actuator or to the transmission, especially when the application of the force continues.

OBJECTS OF THE INVENTION

An object of the present invention is to provide an apparatus and a method for automated actuation of a torque transmitting system and for automated gear shifting which detects the occurrence of excessive forces during gear shifting and which is gentle on the transmission even if excessive forces arise during a gear shifting.

Another object of the present invention is to sense the positioning of the gear shifting elements and to avoid clashing of gear shifting elements so as to prevent damage to the elements and the transmission.

A further object of the present invention is to provide an improved automated transmission.

An additional object of the present invention is to provide an apparatus and a method for sensing conditions or occurrences which are detrimental to the torque transmitting system and the transmission and to control such detrimental conditions by minimizing or forestalling such occurrences.

Still another object of the present invention is to provide an apparatus for automated gear shifting and for an automated torque transmitting system which utilizes building components that can be easily and cost-effectively produced, and which makes the apparatus more reliable and which has a functionality superior to that of known apparatuses.

SUMMARY OF THE INVENTION

These objects are achieved by utilizing controlled actuators which enhances the reliability although the building components are cost-effective.

One feature of the invention resides in providing an apparatus and a method for automated actuation of a torque transmitting system and for automated gear shifting by sensing critical conditions or occurrences during an automated gear shifting. Gear shifting is a process in which the engaged gear ratios of a transmission are changed and thereby internal transmission gear shift elements are released or engaged (brought into contact).

One critical condition can arise during clashing of gear shifting elements. One or more sensors can be utilized to monitor the forces that act upon the gear shifting elements in the transmission, particularly when the elements have teeth which mesh or mate during shifting. The sensor or sensors transmit signals to a control or regulating unit which initiates the operation of an actuator such that, at least temporarily and at least partially, the shifting process is reversed and, at a later point, is continued. "At least temporarily and at least partially" means that the gear shifting is interrupted for about 0.1 millisecond to about 1 second and the operative connection between the gear shift elements is again interrupted such as to avoid an undercut, or a contact or a synchronization.

Another critical condition arises when, during gear shifting, an excessive force acts upon parts, e.g., transmission parts, or when, despite force application, only a small travel (distance) has occurred (or been covered).

In a presently preferred embodiment of the invention, the gear shifting is at least partially nullified causing the torque transmitting system to be engaged at least for a short time so that the transmission input shaft is at least slightly rotated and, thereafter, the nullified gear shifting is continued. The slight rotation of the input shaft covers only a very small angle which allows, for example, for an easy meshing of the gears. For obtaining such rotation, a torque of 1 Nm to 100 Nm is applied, and preferredly 3 Nm to 20 Nm.

Another feature of the invention resides in providing an apparatus and a method for automated actuation of a torque transmitting system and for automated gear shifting including at least one sensor for determining the magnitude of a variable representing a position which can be changed by one or more actuators to shifting gears. It can be advantageous that, with the previously intentionally disengaged torque transmitting system to monitor the variable as a function of time, and, after a specified time with only a slight or no change of the variable representing the position, to at least temporarily and at least partially undo or nullify the gear shifting and to temporarily control the torque transmitting system so that at least a slight torque is transmitted, the gear shifting being continued thereafter.

Also, an apparatus is provided to have a torque transmitting system connected to a propulsion unit and a transmission, with a system for automatic control of a torque transmitting system and for automated gear shifting of a transmission in the power train of an automotive vehicle with at least one actuator for at least controlling the torque transmitting system and/or at least the control elements of the transmission, with one or more control being in signal transmitting communication with one or more sensors and possibly with one or more other electronic units. For controlling one or more actuators with a controlling device (sensor), and to determine the magnitude of a force variable generated by one or more actuators necessary for gear shifting, the torque transmitting system being previously undone, a critical condition in the transmission during an automatic gear shifting, such as a condition in which toothed gear shift elements under positive force come into contact, is monitored by this variable as a function of time. In the case of a specifiable time duration with only a small change of the variable representing a position, (or no change at all), the gear shift process is at least temporarily and at least partially undone, the torque transmitting system being at least temporarily controlled so that at least a slight torque is being transmitted, the gear shift process being resumed thereafter.

An additional advantage of the invention is that one can utilize sensor means for determining a first variable representing at least a force generated by one or more actuators and for determining a second variable representing a variable position of an element which can be changed by one or more actuators, and that, with a released torque transmitting system, that first variable which represents an excessive force is detected by comparison to a reference value during an automatic gear shifting, and the second variable is monitored as a function of time, the gear shifting is at least temporarily and at least partially undone, the torque transmitting system is at least temporarily controlled or regulated so that at least a slight torque is transmitted in the event the first variable exceeds the reference value and the second variable representing a position showing only a slight or no change after a specifiable time duration, the gear shift process being resumed and continued thereafter.

It is also an advantage to determine the excess (compared to a reference value) of the force-representing variable as a function of time, and if the reference value exceeds a specifiable time duration, the gear shifting is at least temporarily and at least partially undone and the torque transmitting system is at least temporarily controlled so that a slight torque is transmitted, and the gear shifting is resumed thereafter.

It is preferred to make the duration of the specifiable time dependent on (a function of) the amount by which the variable exceeds the reference value. It is further preferred to make the duration of the specifiable time dependent on the gear ratio to be shifted in the transmission.

Another preferred embodiment resides in the provision of an actuator that controls the torque transmitting system and thereby to determines the torque which is transmitted by the torque transmitting system. It can be useful that at least one actuator controls the gear shifting of the transmission, for example, that two actuators control the gear shifting of the transmission.

An additional embodiment of the invention provides for utilizing an actuator for shifting into selected gears and also for controlling the torque transmitting system.

Furthermore, it is of advantage that the actuator which controls the gear shifting comprises a cylinder cam, disposed within or outside of the transmission.

It is also useful that the actuator or actuators for the torque transmitting system or for the shifting of the transmission be equipped with an electrical prime mover such as an electric motor.

In addition, it is useful that the actuator or actuators be equipped with an electromagnetic drive element for controlling the actuation of the torque transmitting system or the gear shifting in the transmission.

Also, it is useful that one or more actuators be equipped with a pressure-controlled drive element for controlling the actuation of the torque transmitting system and/or the gear shifting in the transmission. The pressure-controlled drive element can be a hydraulic, hydrostatic, pneumatic or hydropneumatic drive element.

Another embodiment of the invention provides for a mechanical transmission line (linkage), such as a Bowden cable, a cam, or a pressure-actuated transfer line, such as a hydraulic or pneumatic or other transmission line which is located between the actuating element and the control element of the torque transmitting system. Further, the mechanical transmission line or pressure-actuated transfer line, as described, can be located between the actuating element and the control element of transmission for gear shifting.

Another embodiment provides for one or more sensors detecting the force which one or more actuators apply in connection with shifting the gears.

When an actuator with an electrical drive is utilized, it is advantageous to sense an electrical variable, such as electrical current or voltage, as a signal that is proportional to the force or a variable representing the force. Typical sensor means employed in such embodiment could include a pressure, force or distance sensor which produces a signal proportional to the force or proportional to the variables representing the distance.

Also within the invention is to utilize a control unit with two sub-units, one sub-unit controlling the torque transmitting system and the other sub-unit controlling the gear shift process. Both sub-units may form the control unit. However, one sub-unit may be integrated into the actuator of the torque transmitting system and the other sub-unit may be integrated into the actuator of the transmission or the transmission control unit.

One sub-unit may be within the control unit of the torque transmitting system and the other sub-unit in a control unit of the transmission.

It is further provided that one or more sensors can detect a predetermined (e.g., critical) condition such as a condition in which an excessive force is being applied by the actuator during a gear shifting and the sensor or sensors generate one or more signals representing the force or representing the distance. The sensor or sensors can be designed to detect a condition denoting an insufficient change per time interval. Further, the sensor or sensors can detect the application of an excessive force or an insufficient distance change per time unit (compared to reference values of the force or of the distance or travel).

Yet another embodiment provides a device for the control of a transmission and a torque transmitting system, such as a clutch, during gear shifting.

It is also within the purview of the invention to provide a method of controlling by one or more actuators the torque transmissible by the torque transmitting system and the actuation of the gear shifting in a transmission to perform the following step or steps during the shift to a desired gear ratio or gear: (a) upon detection of a signal for gear shifting, the torque transferrable by the torque transmitting system is reduced to a specifiable, yet variably selectable value of essentially zero; (b) the gear shifting process is initiated by a control unit and one or more actuators cause a movement of internal transmission elements to a transmission-neutral position; (c) one or more actuators select internal transmission gear shift elements and actuate them to assume a transmission-neutral position; (d) one or more variables of the gear shifting are detected by one or more sensors as a function of time and representing a force generated by one or more actuators to shift the gears or the positions of internal transmission elements; (e) the variable(s) is (are) compared to a reference value by a comparison device; (f) upon the variable(s) being higher than the reference value(s), or upon the rate of change of a variable being lower than the reference value(s), the gear shifting is interrupted and the actuation of the internal transmission elements is undone at least partly for a short time; (g) at least temporarily a different gear ratio than the desired one is controlledly shifted, followed by controllably shifting into the desired gear ratio; (h) the torque transmitting system is at least partly engaged during a short time for obtaining at least a slight rotation of the transmission input shaft; (i) the gear shifting is resumed.

The desired gear ratio or gear is the gear ratio or gear that will be the next controlledly engaged one. The driver can make the selection by transmitting a signal, e.g., actuating a switch, transmitted to the control unit; or, the control unit automatically selects the next gear to be shifted into, by utilizing, e.g., sensor signals or system input variables, and by using shifting characteristics or maps and/or functions. The desired gear can be, e.g., in a six-speed (shift) transmission with one reverse gear, any gear ratio of these six drive ratios or the reverse ratio. A gear ratio differing from the desired one can, e.g., be one of the gear ratios currently not to be shifted into. Different transmissions, such as a four-speed or five-speed transmission, can also be used.

When the variable(s) representing a force exceeds or exceed a reference value during a specified time, it is advantageous to interrupt the gear shifting and to undo at least partially the actuation of the internal transmission elements during a short time, so as to bring about an at least slight angular and/or axial displacement of the transmission input shaft, followed by renewed gear shifting until the shifting into the new gear is completed.

Similarly, when the rate of change of the variable representing a position drops below a reference value during a specified time, it is advantageous to interrupt the gear shift process and to undo at least partially the actuation of the internal transmission elements during a short time, so as to engage the torque transmitting system at least partly again during a short time to obtain at least a slight displacement of the transmission input shaft, followed by renewed gear shifting until the shifting into the new gear is completed.

Also, when the rate of change of one or more variables representing a position drops below a reference value during a specified time and the one variable representing a force exceeds a reference value during a specified time, it is advantageous to interrupt the gear shift process and to undo at least partially the actuation of the internal transmission elements during a short time, to engage the torque transmitting system at least partly again during a short time to obtain at least a slight displacement of the transmission input shaft, followed by a resumption of gear shifting until the shifting into the new gear is completed.

The variable representing a force or a position is detected by a sensor, such as a position, travel, pressure, acceleration or force sensor. It is desirable to use as a signal representing a force, an electrical current or voltage of one or more electric motors of the one or more actuators.

Also, it can be advantageous if the rotational speed of one or more electric motors connected to one or more actuators is used as a signal representing a position.

Further, one or more reference values can be obtained by addressing one or more memories. It is advantageous when a reference value is the same for all gear ratios of the transmission, or is selected as a function of the gear currently to be shifted into. At least one time duration is or can be the same for all gear ratios of the transmission, or is selected as a function of the gear currently to be shifted into.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
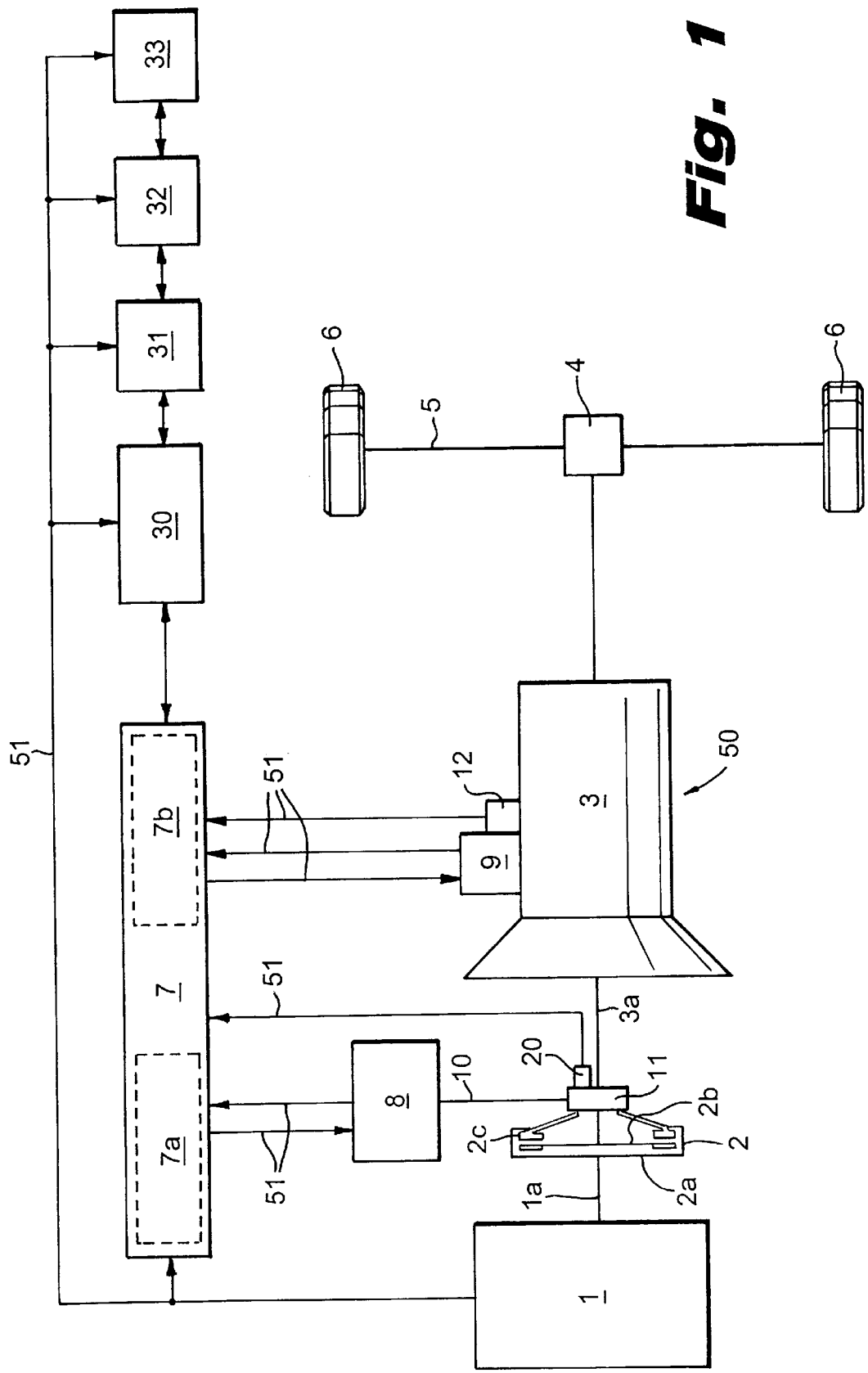
FIG. 1 is a schematic representation of an apparatus for automated actuation of a torque transmitting system and for automated gear shifting.

FIG. 1 is a schematic representation of a motor vehicle 50 embodying an apparatus for automated actuation of a torque transmitting system 2 and for automated shifting of a transmission 3 and further including a propulsion unit 1, such as a combustion engine, in the power train. The torque transmitting system 2 can constitute a friction clutch, a multiple disk clutch, a magnetic powder clutch, a torque converter with lock-up clutch or another torque transmitting system, and the vehicle further includes a differential 4 and a drive axle 5 driving the wheels 6.

The engine output shaft 1a is operatively connected with a flywheel 2a of the torque transmitting system 2, and the latter further comprises a clutch plate 2b which is substantially rigidly connected to a rotary transmission input shaft 3a so that in the engaged mode of the system 2 the pressure plate 2c can control the transmissible torque of the torque transmitting system 2.

Also, a central control or regulating unit 7, such as a computerized unit can receive signals from sensors and can be in signal transmitting connection with other electronic units. The central control or regulating unit can include two sub-units, one sub-unit controlling the torque transmitting system, the other sub-unit controlling actuation elements to shift the gears, such as actuators 8 and 9.

Actuator 8, via line (connection) 10, controls an element 11 to disengage the torque transmitting system. Actuator 8 can be equipped with a cylinder, line 10 can be a hydraulic line and the release element 11 can be a central hydraulic release element. Furthermore the connection can also be a purely mechanical line controlling the torque transmitting system via a lever or a linkage. Bowden cables can be used as well. The actuator can use a different pressurized medium for the transmission of the motion/force, the line 10 being a pressure connection in this case.

The actuator 9 serves for the automatic control of transmission 3, with a central shifting shaft in the transmission, the actuator 9 controlling the required motions in axial direction and/or in circumferential direction of the shifting shaft to shift the gears. The actuator 10 can also control other shifting elements, e.g., three shifting shafts to shift a five-gear transmission with reverse gear.

Detection devices, such as sensors, are provided to detect the applied force or a load upon transmission components and/or other elements, or variables representing such a load. A sensor 12 detects a variable representing, e.g., one or more forces necessary to carry out the gear shift. This force is applied by actuator 9 to a control element of transmission 3 to engage a gear or to change a gear or to shift to neutral position. Sensor 12 can also detect the positions of internal transmission elements, the control unit 7 determining the travel/time characteristic of these shifting elements and detecting an excessive force applied to components by representative elements in the travel/time characteristic. Such a representative element can be, e.g., an insufficient travel during a specified time, for the force applied. This high applied force should entail a higher actuation speed, which makes this a critical condition.

Actuators 8 and 9 are in signal transmitting communication with the central control unit 7, whereby it is made possible to exchange information from the actuators, as well as control commands given to the actuators. Sensor 12 is also in signal transmitting communication with the control unit 7. As is shown, the engine control unit can also be in signal transmitting communication with the control unit 7.

The torque transmitting system 2 is equipped with a sensor 20 which is installed either at the torque transmitting system, or at the signal transmitting communication line 10, or at the actuator 8. Sensor 20 detects directly or indirectly the condition (disengaged or engaged) or the torque or the transmitted torque from the torque transmitting system. In response to an appropriate signal from sensor 20, the unit 7 controls or regulates the extent of engagement of the torque transmitting system (clutch) 2 during the gear shifting and also during other operating conditions, such as, the starting or stopping of the automotive vehicle.

The control unit 7 can include sub-units 7a and 7b, which may be separated in space or they may be grouped together. Control unit 7 can also be integrated in a transmission control system. Also, the control unit 7, can cooperate with an engine control unit 30, a slip control unit 31 or a traction control unit 32 or an anti-locking system 33. The signal transmitting communication lines are generally designated by 51. They serve for data transmission between the sensors and the control units or between different control units.

The control unit 7, can exhibit or embody all ranges of an electronic clutch management system of the type disclosed in DE-OS 195 948 47. The disclosure of this DE-OS 195 94 8 47 is incorporated by reference into the disclosure of the present invention.

Control unit 7 controls the automatic operation of the torque transmitting system 2 and the transmission 3 by the actuators 8 and 9, the selection of the gear or the gear ratio being specified either by a knob by the driver of the automotive vehicle, or fully automatically selected and performed by the control unit. In order for the driver to make such selection, a gear selection control element must be provided for the driver of the automotive vehicle, e.g., it may be integrated into the steering wheel, for easy access to the gear selection.

When a next higher gear is selected by activating a knob or a key, a signal is transmitted to the control unit 7, which controls automatic disengagement of the clutch by actuator 8 and initiates the shifting of the gears in the transmission by actuator 9.

For an automatic actuation of the transmission 3 by the control unit 7, the gear of the transmission to shift into is determined, e.g., by rotational speed and torque data of the engine and/or wheel RPM or the automotive vehicle speed and/or transmission input and/or transmission output rotational speeds, using mathematical equations or maps, to obtain a high comfort with the determined data and/or high accelerating capability and/or low fuel consumption.

Actuator 9 for transmission control may be a cylinder cam actuator, wherein the rotation of the cam controls internal transmission elements to shift the corresponding gears of the transmission or to release the gears from the engaged position. The actuator, however, can also be an actuator controlling the central shifting shaft of the transmission.

Figure 2:
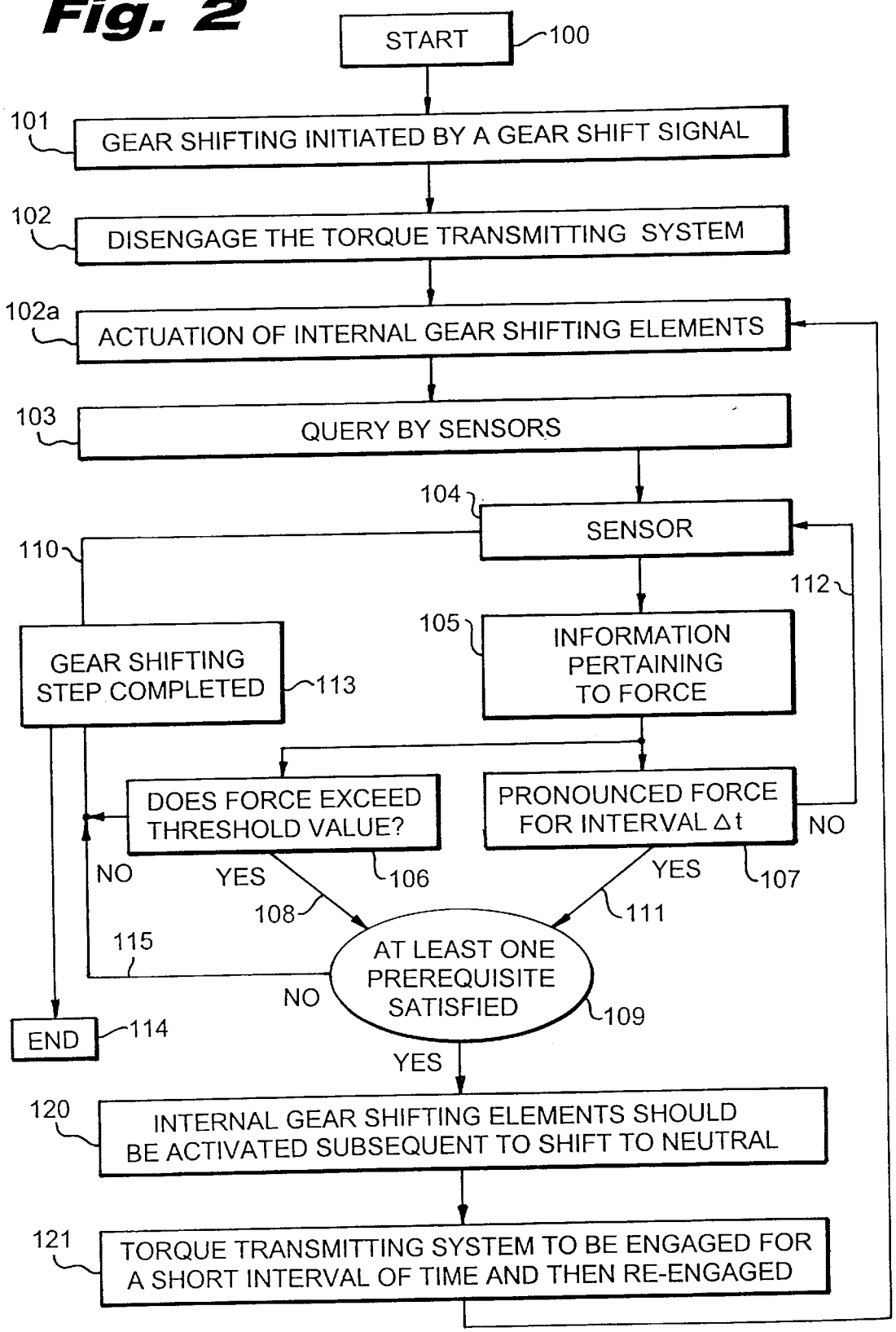
FIG. 2 is a block diagram, illustrating one method of utilizing the apparatus of FIG. 1.

FIG. 2 shows a block diagram, illustrating one method of utilizing the apparatus of the invention. The procedure starts at the block 100. Block 101 represents the gear shifting, initiated by a shift command. The shift command initiating or starting the gear shifting can either be given by the driver, or by the control unit. Automated transmissions can be, e.g., equipped with switches or knobs, such as pushbuttons, or levers so that a signal denoting driver intention is transmitted to the control unit. Sequential shifting, e.g., can be ordered by the driver. In another embodiment of the invention, it may be practical to control the automated gear shift process in a fully automatic way by the control unit. A characteristic field (map) or a function, e.g., is stored in a memory of the control unit for this purpose and the transmission gears are shifted according to the automotive vehicle parameters.

The control unit determines the gear to shift to, depending on the operational parameters, or to stay in the current gear. A sequential or non-sequential shift is possible, depending on the construction of the actuator used to shift the gears of the transmission, gear shift commands given by the driver initiating gear shift commands using the means described above.

A plausibility check can be run before a gear shift following a gear shift command in block 101 is started, checking whether shifting to another gear is possible and/or if shifting to another gear is appropriate. A check can be made, e.g., to ascertain whether or not the engine speed has risen above or has dropped below a predetermined (critical) value after the gear shift.

Other plausibility decisions are possible to guarantee the safe condition of the engine and/or the transmission or the automotive vehicle.

After initiating the gear shifting subsequent to a gear shift command in block 101, the torque transmitting system is disengaged as denoted by the block 102, which means that the actuator controlling the torque transmitting system is being operated by the control unit to disengage the torque transmitting system.

The torque transmitting system is either fully disengaged, or only disengaged to an extent such that a gear shifting is possible. This means that the clutch is disengaged to a condition offset from the engagement point by a certain amount in a direction toward full disengagement. In such a position, the clutch is disengaged at least so far that no drag torque is being transmitted and that a gear shift can be performed. A different condition between the engagement point and the fully disengaged condition is also possible.

Block 103 represents the carrying out of the gear shifting. To that end, the actuator(s) is or are controlled by the control unit so that a force is applied to an element for performing the gear shift operation, and internal elements of the transmission are actuated. During this gear shifting process, depending on the initial position with an engaged gear or in neutral position, the existing gear contact of internal transmission shift elements is terminated before a different group of internal transmission shift elements are selected through a neutral zone, and the elements of this different group are then brought into mesh.

The internal transmission gear shift elements are acted upon by one or more actuators, the controlling force for the actuation remaining at least substantially below a threshold value (limit value) and the development of the position of the internal transmission gear shift elements also not falling below or rising above a threshold value or limit value which is a function of time. This means that the movement of the internal transmission gear shift elements, due to the applied force, exhibits a certain velocity which depends on the nature of operation of the actuator and on the nature of the control or regulation.

Although infrequently, it might also happen that, during gear shifting, the top lands of the teeth of toothed gear shift elements or other parts of the internal transmission gear shift elements will collide or clash and thus prevent satisfactory engagement of the gears. In such a case, the velocity of the internal transmission gear shift elements drops substantially to zero and the actuation force applied to the internal transmission gear shift elements increases.

The block 103 denotes a reading or addressing (query) of sensors which, e.g., detect a variable representing the actuation force or a variable representing the actuation travel, the sensor data being determined as a function of time and the control unit being able to numerically determine such data through differences/quotients, such as velocities and rates of change of variables.

Block 104 denotes the sensors addressed (queried) in block 103. In the event of utilizing an electric motor actuation, the current and/or voltage, can be used as a signal for the detection of the force or the travel or a signal representing one of these variables. Pressure or force or travel sensors can also be used.

Based upon the thus obtained sensor data, block 105 denotes the evaluation of force information supplied by the sensor 104. For that, the force is calculated or converted into a signal proportional to the magnitude of the force. Other embodiments provide for directly comparing the sensor output signal(s) without conversion to a force information.

The blocks 106 and 107 denote the evaluation of the signal from the sensor 104. Block 106 denotes an examination whether or not the force exceeds the limit value. If it so does, following arrow 108, the sequence continues as denoted by the block 109; otherwise, and as indicated by the arrow 110, the sequence continues with block 104. Block 107 denotes a determination as to whether or not a pronounced or excessive force is applied to the internal gear shift elements during an interval $\Delta t$. The sequence continues as indicated by the arrow 111 at the block 109 if the force is than greater the reference value during an interval $\Delta t$, whereas, in the case of a negative response to an inquiry as denoted by the block 107, the sequence follows arrow 112 to continue with block 104. Block 109 denotes an inquiry if at least one of the conditions of block 106 or block 107 is met. If the answer is no, block 113 denotes a determination whether or not the gear shift process has been completed. Should this be the case, the procedure ends at block 114. Block 113 can also be placed in the sequence of block 109 at path 115 or in the zone of path 112.

In the event of a positive answer to the query at block 109, the internal transmission elements are moved in neutral direction at least for a short time or at least partially; this is indicated by the block 120. The block 121 denotes that the torque transmitting system is engaged at least for a short interval of time and is disengaged thereafter by the actuator, the engagement occurring at least so that a slight torque can be transmitted and an at least short-lasting displacement (such as rotation) of the transmission input shaft occurs. The torque transmitting system can also be completely engaged during a short interval time, or engaged partially.

After disengagement of the torque transmitting system, the internal gear shift elements per block 102a are actuated to start another gear shift.

Figure 3:
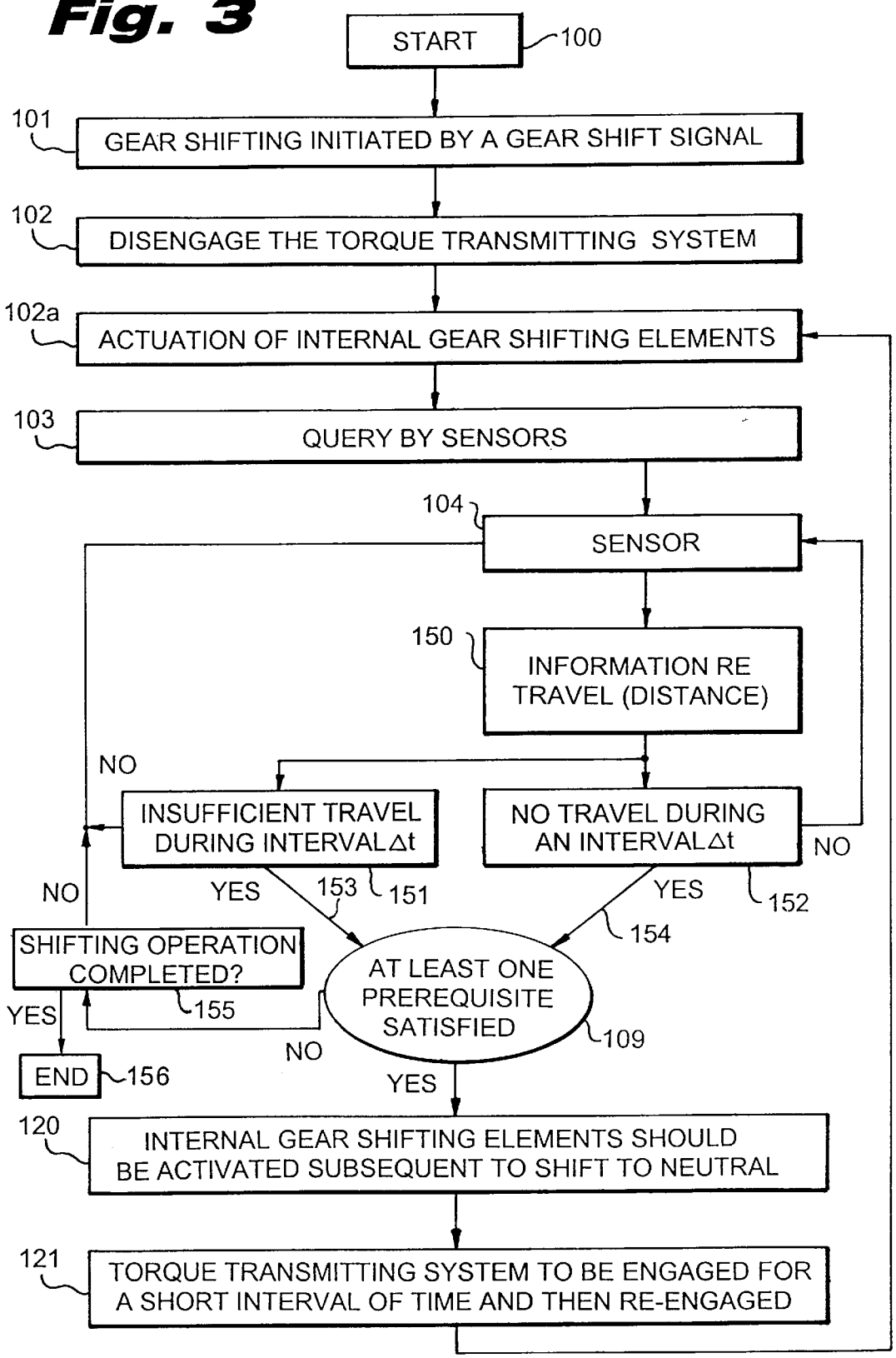
FIG. 3 is a block diagram, illustrating a variation of the method of utilizing the apparatus of FIG. 1.

FIG. 3 shows a block diagram similar to that of FIG. 2, the blocks 100, 101, 102, 102a, 103, 104, 109, 120 and 121 representing the same steps or series of steps as in FIG. 2. An inquiry as to travel is denoted by the block 150 in lieu of the inquiry regarding the force block 105 of FIG. 2. Blocks 151 and 152 denote inquiries whether or not an insufficient travel was carried out during the time interval $\Delta t$ or whether no travel at all occurred during the time interval Δt. In such cases the sequence moves to b lock 109 as indicated by the arrows 153 and 154. The sequence continues at block 104 if the queries at blocks 151 and 152 are answered in the negative. Block 155 denotes an inquiry as to whether or not the gear shift process is completed if the query at block 109, whether at least one of the conditions was met, is answered in the negative before completing the procedure at block 156. The internal transmission elements are moved in a direction toward neutral if the answer in block 109 is in the affirmative, as shown in block 120, and the torque transmitting system is engaged at least for a short interval of time and at least partially, then disengaged again, as shown by block 120.

It will be seen that the diagram of FIG. 2 illustrates a procedure utilizing the force information, whereas the diagram of FIG. 3 shows a procedure of evaluating a travel information.

Figure 4:
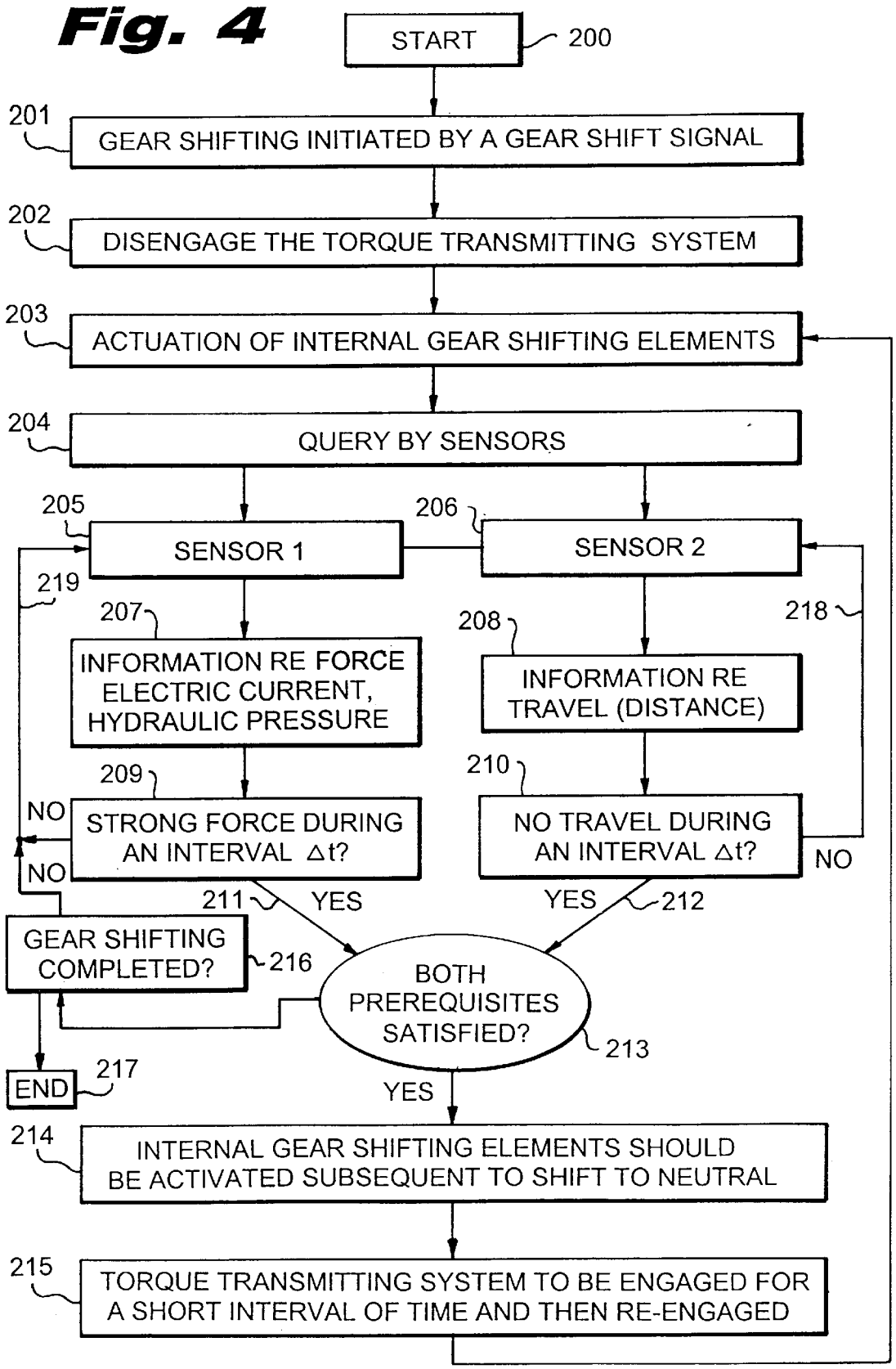
FIG. 4 is a block diagram, illustrating yet another variation of the method of utilizing the apparatus of FIG. 1.

FIG. 4 shows a procedure evaluating a travel and a force information as well.

The procedure is started at block 200, the gear shift process being initiated after a start signal in block 201. Thereafter, the torque transmitting system is disengaged as denoted by the block 202, as described above in connection with the block 102, and the block 203 denotes that the internal gear shift elements are actuated by an actuator. The block 204 denotes that the sensors are queried, the sensors being sensors 205 and 206. Sensor 205 detects a variable representing a force, and sensor 206 detects a variable proportional to a travel or representing a travel. This is shown by blocks 207 and 208. The signal from sensor 1 (205) is converted into a force information, e.g., an electric current or a hydraulic pressure or any other variable, and the signal from the sensor 2 (206) is converted into a travel information (block 208). Blocks 209 and 210 denote inquiries if, for a time interval Δt, an excessive force has been generated, or for a time interval Δt no or only a small travel has been completed. In this case the paths denoted by the arrows 211 and 212 query block 213 as next block. Block 213 queries whether both conditions are met. In this case the internal transmission elements are actuated towards neutral transmission position as shown by block 214. Furthermore, the block 215 denotes that the torque transmitting system is engaged at least for a short time interval and is disengaged again thereafter to obtain a displacement of the transmission input shaft. In the case of a negative answer at 213 block 216 denotes an inquiry whether the gear shift process has been completed. The sequence continues, as indicated by the blocks 205, 206. If this is not the case, the procedure terminating at block 217 with a completed gear shift process.

The query whether the gear shift process is completed can also occur in the paths 218 and 219. This is possible, e.g., if an analog or digital sensor sensing the end of the gear shift process is queried, a travel sensor also being a satisfactory sensor for the detection of the final position of the internal transmission gear-shifting elements.

If the transmission is a shift transmission, in particular with traction force interruption during a gear shift, the gear shift process is essentially divided into four phases, synchronization, unlocking, free motion and engagement. To be able to discuss the principle of a gear shift process it is useful to visualize the configuration of a transmission. The main components are the gear wheel with gear teeth, the synchronization ring with gear teeth and the toothed sliding bushing.

During synchronization, the synchronization ring is pushed onto the cone of the coupling body. The corresponding friction torque leads to an equalization of the revolution speed, i.e. to a synchronization of the rotational speed of internal transmission elements. During the unlocking phase after the synchronization, the sliding bushing first rotates the partners connected by friction, namely the synchronization ring and the coupling body. The free motion phase starts when the gear teeth of the synchronization ring engage the sliding bushing gear, i.e., directly after unlocking. During engagement, namely, the last phase of the gear shift process, the gear teeth of the sliding bushing randomly contact the gear teeth of the coupling body. Functioning of the synchronization during a gear shift process is known and is disclosed, for example, in VDI-Report No. 681, pages 177 to 206.

The gear shifting is subdivided into several phases, and the components participating in the gear shift process will be placed at different positions, e.g., as a function of time. These phases are as follows: in a first phase, a play is overcome, thereafter a preliminary synchronization takes place, then the synchronization. This is followed by unlocking, free motion, engaging of the gears, attaining backing and attaining the final position of an element participating in the gear shift process. During the engagement, the top lands or tips of discrete gears may enter in contact so that engagement scratching occurs or the engagement is hindered. These events are faulty conditions, which may randomly appear during automated shifting. Such contacts of gear fronts at increased force application can adversely affect the transmission, and can even destroy components. In such a case, the actuator force can increase to a maximum force, and the actuator can stop, even with maximum load, which will temporarily interrupt the gear shift process. In this phase there is a faulty condition, which should be prevented and/or should cause a reaction. The above fault functions are random, which means that methods to prevent such fault conditions cannot be applied every time. For this reason it is practical, if such a condition occurs, to detect it and to react accordingly in the event of such a fault to let the faulty condition prevail for a very short time only. Generally the occurrence of the faulty function is not related to or associated with a specifiable position of a transmission component, but such conditions, e.g., the contact of toothed fronts can be variable, caused, e.g., by wear upon components.

Problems can occur during the engagement of gears if, e.g., excessive frictional forces occur, the toothed surfaces being unfavorably positioned relative to each other (engagement lock). Toothed fronts can also contact each other directly so that an engagement becomes impossible again. Generally toothed fronts are rounded, which means that a front-front contact occurs when the rounded gear fronts contact each other with a very small contact angle between the gear fronts, leading to jamming. An engagement is not possible in this positioning. No backing or overlapping of the tooth flanks is possible, the gear cannot be shifted and thus the transmission of torque is not possible.

The detection of such a faulty condition is of critical importance. Sensors transmit force and/or travel information and process them, e.g., as a function of time, followed, as a function of time, by an analysis whether a faulty situation exists, e.g., an engagement lock or an improper tooth-tooth contact. The actuation force increases if a force is applied without the corresponding actuation travel of the internal transmission gear shift element, and when the actuation force exceeds a typical value for a normal gear shift process without faulty function, a functional fault can be deduced. A functional fault can also be assumed to exist if the actuation travel as a function of time does not change in the range of the normal actuation travel, or if the actuation travel is zero over a certain time interval.

Basically four initial conditions must be examined in the case of gear engagement problems. The automotive vehicle can be stationary or moving, the automotive vehicle engine can be running or not. A permutation of these states gives four possibilities of stationary automotive vehicle with engine stopped, stationary automotive vehicle with running engine, or moving automotive vehicle with engine stopped and moving automotive vehicle with running engine. The following method can be used, depending on the current gear and/or the target gear, if the automotive vehicle is stationary and the combustion engine or propulsion engine of the automotive vehicle is not running.

When a gear is actually selected to obtain a parking lock, e.g., the first gear or the reverse gear, and the target gear during a gear shift process is a different gear, it is possible, in the case of an engagement problem, to shift to a different gear at least for a short time to obtain a rotation in the transmission, thus removing the engagement problem.

If the effective gear is the neutral, and the target gear is any other gear X, the trial can be repeated n times, e.g., to shift into gear X in the case of an engagement problem, i.e., to shift into gear X if the engagement problem still exists. If, after n trials to shift into gear X, it is still not possible to shift into this gear, a different gear Y can be shifted to obtain a rotation of the gears of the transmission components. Thereafter shifting into gear X can be tried again. If shifting into gear X is still not possible due to an engagement problem, several trials by shifting into gear Y can be repeated to turn the gears of transmission elements so that shifting into gear X becomes possible. If, thereafter, it is still not possible to shift into gear X, a trial can be repeated n times again with a gear Z, to shift into gear X afterwards. If that is not possible either, it is possible to shift into all other gears of the transmission and to try to shift into gear X afterwards.

Gears X, Y, Z can be any gears of the transmission, such as one of the gears 1 to 6 or R.

Figure 5:
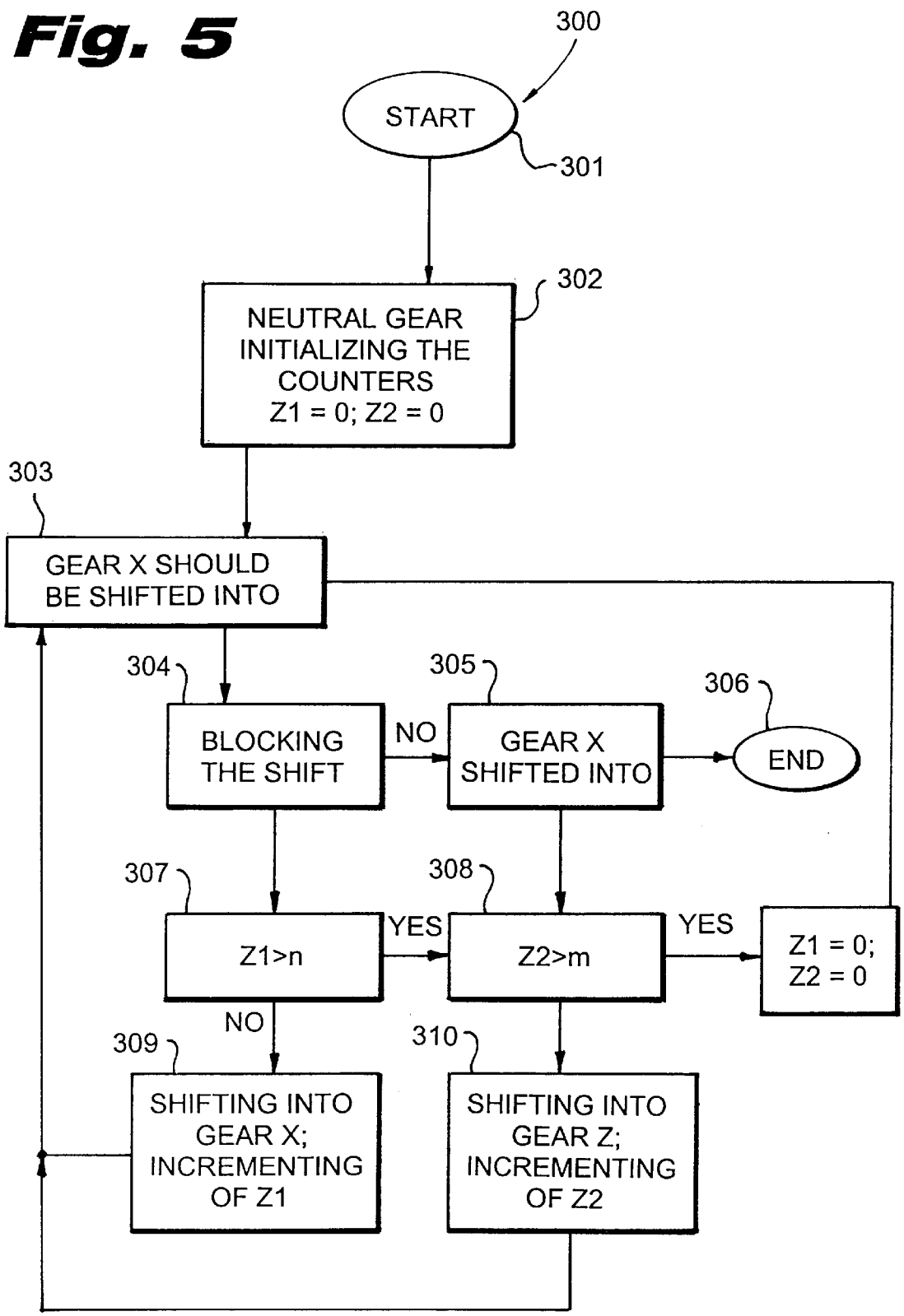
FIG. 5 is a block diagram, illustrating yet another variation of the method of utilizing the apparatus of FIG. 1.

This method used for an engagement problem causes a rotation of the transmission elements by shifting into gears Y or Z, such rotation of the transmission elements removing the engagement lock when shifting into gear X is repeated or tried again. This method is illustrated in FIG. 5 as block diagram 300. The procedure for a gear shifting is started at block 301. Block 302 denotes whether the neutral gear is engaged or existing, and counters Z1 and Z2 are initialized and set to zero. Thereafter, at block 303, a shift into gear X, e.g., into the first or second or third one or any gear or reverse gear of the transmission, is attempted. Block 304 denotes the inquiry whether there is an engagement lock. This can be done, e.g., as described above by resorting to a force sensor, the existence of an excessive force above the force threshold of this signal being evaluated as the existence of an engagement lock. A travel sensor can also be used, namely to detect the actuation travel of an internal transmission gear-shifting element, and in the case of an insufficient actuation travel as a function of time, indicate the existence of an engagement lock. Block 305 indicates that the gear X is shifted into if no engagement lock exists at block 304, and the procedure terminates at block 306. The counter Z1 at block 307 is addressed if an engagement lock exists in block 304 or if the signals from indicating the force and/or travel sensor are interpreted or evaluated as an existing engagement lock. The sequence continues with block 308 if counter Z1 indicates that a value n is exceeded.

Block 309 indicates an interruption of the gear shift process if Z1 does not indicate that the value n has been exceeded by not shifting into gear X, but instead shifting into gear Y is controlled. Thereafter, counter Z1 is incremented by one, and the sequence continues at block 303. Block 308 indicates an inquiry whether the value indicated by the counter Z2 is greater than a value m. If this is not the case, block 310 denotes an interruption of shifting into gear X and thereafter shift into gear Z. Thereafter the value of Z2 is incremented, and the sequence continues at block 303. Each of the counters of Z1 and Z2 is reset to zero when the value contained in Z2 exceeds m in block 308, and the sequence continues with block 303.

In the event of an engagement lock when shifting into gear X, a different gear is shifted into first, e.g., gear Y or gear Z, to obtain a rotation of elements with the intention of removing the initial engagement lock.

In the event of a stationary automotive vehicle with running combustion engine (or propulsion engine), with any gear engaged and the clutch disengaged, or the neutral engaged with engaged or disengaged clutch, the selected target gear being the reverse gear, the following procedure can be used to shift into reverse gear in the case of an engagement lock: the clutch is engaged at least partially during a short time and thereafter disengaged without backing the sliding bushing. This will turn the gear wheel, and the gear can possibly be engage. It is also possible to engaged the clutch without backing the sliding bushing. This will turn the gear wheel and the sliding bushing gears slide into backing position. Also, the sliding bushing can be backed to neutral position, but not up to synchronization position. A new attempt to shift into the reverse gear can be undertaken thereafter. After backing the sliding bushing to neutral the clutch can be engaged at least for a short time and disengaged again thereafter to try again to shift into the reverse gear. Furthermore, the sliding bushing can be backed to neutral position, thereafter the reverse gear is shifted into again. In the same way other gears can be shifted without engaging the clutch, to shift into reverse gear again thereafter. Moreover, in the neutral range, the clutch can be engaged to obtain a rotation of the gear shaft, then disengaged again to shift the reverse gear, the clutch being disengaged. Other combinations of the steps described above can also be used. These steps can also be carried out with engaged reverse gear and the clutch disengaged or with engaged neutral gear if the target gear is a forward drive gear. The methods and steps described above can also be performed if the automotive vehicle is moving and the combustion engine (or propulsion engine) is not running and the effective gear is the neutral gear, the target gear being a drive or reverse gear. This method can also be used if the automotive vehicle is moving and the combustion engine is running to shift from any gear to any drive and/or reverse gear.

In the event of an engagement lock in a specific gear to be shifted into the method described above consists in trying to shift into another gear at least in the meantime, and trying again to shift into the intended gear thereafter. If unsuccessful, the other gear can be shifted into several times and/or a second, different gear can be shifted into, trying again to shift into the intended gear thereafter.

The patent claims accompanying the application are formulating proposals without prejudice for the obtainment of further patent protection. The applicant reserves the right to claim other characteristics currently only disclosed in the specification and/or only shown in the drawings.

Further, while there have been shown and described and pointed out fundamental novel features of the invention as applied to certain preferred embodiments thereof, it will be understood that various omissions and substitutions and changes in the form and details of the devices illustrated, and in their operation, may be made by those skilled in the art without departing from the spirit of the invention. It is expressly intended that all combinations of those elements and/or method steps which perform substantially the same function in substantially the same way to achieve the same results be within the scope of the invention. Substitutions of elements from one described embodiment to another are also intended and contemplated. It is also to be understood that the drawings are not necessarily drawn to scale but that they are merely conceptual in nature. It is the intention, therefore, to be limited only as indicated by the scope of the claims appended hereto.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of controlled automated gear shift transmissions and, therefore, such adaptations should and are intended to be comprehended within the meaning and range of equivalence of the appended claims.

What is claimed is:

1. An apparatus for automated controlling of an engageable and disengageable torque transmitting system and of a transmission comprising mobile internal gear shifting elements and being connected to the torque transmitting system by an input shaft, said system and said transmission being disposed in a power train of a motor vehicle having a prime mover, comprising:

a control unit;

at least one actuator in signal transmitting communication with said control unit and connected (a) to said transmission for shifting into any one of a plurality of gears and (b) to said torque transmitting system for controlled engagement and disengagement thereof; and at least one signal transmitting sensor arranged to operate between said control unit and said transmission to monitor conditions in the transmission during automated gear shifting and to detect a predetermined condition while said system is disengaged and, upon detection of said predetermined condition, to undo, at least temporarily and at least partially, the preceding gear shifting, and to thereafter renew gear shifting.

2. The apparatus of claim 1, wherein said internal gear shifting elements include toothed portions and wherein, upon movement of said gear shifting elements during shifting into one of said gears, said toothed portions exhibit a tendency to clash at random intervals to thus established said predetermined condition including the generation of a detectable force.

3. The apparatus of claim 1, wherein when the control unit initiates actuation of at least one actuator such as to undo at least temporarily and at least partially the gear shifting, the torque transmitting system is engaged temporarily, and the transmission input shaft is rotated.

4. An apparatus for controlling an automated gear shifting of a transmission and an engageable and disengageable torque transmitting system, comprising:

at least one actuator for actuating the torque transmitting system;

at least one sensor connected to the at least one actuator; and at least one control unit in signal transmitting communication with the at least one sensor for controlling the at least one actuator by sensing a force-representing variable generated by the at least one actuator during shifting, comprising means for comparing the force-representing variable to at least one reference value determined during a previous shifting, when the torque transmitting system was disengaged.

5. An apparatus for controlling an automatic engageable and disengageable torque transmitting system and for automatic shifting of a transmission in the power train of an automotive vehicle, comprising:

at least one actuator for controlling at least one of the torque transmitting system and the transmission;

at least one control unit in signal transmitting communication with at least one sensor for controlling the at least one actuator, the at least one sensor being arranged to detect a position-representing variable which during shifting is modifiable by the at least one actuator, and is monitored as a function of time, the torque transmitting system being disengaged before an automated shifting, and the shifting being at least temporarily and at least partially undone after a monitored position-representing variable is identified, followed by a resumption of shifting.

6. An apparatus for controlling automated gear shifting in a power train of a of an automotive vehicle having a propulsion engine, comprising:

a system for automatic actuation of an engageable and disengageable torque transmitting system and a transmission in the power train;

at least one actuator for controlling at least one of the torque transmitting system and the transmission;

at least one control unit in signal transmitting communication with the at least one actuator; and at least one sensor for determining a force-representing variable exerted by the at least one actuator, wherein in the torque transmitting system having been previously intentionally disengaged during an automated gear shifting, and a predetermined condition in the transmission being detected when said force-representing variable exceeds a reference value, the shift process is undone at least temporarily and at least partially so that at least a small torque is transmitted, followed by a resumption of shifting.

7. An apparatus for controlling automated gear shifting by a transmission in a power train of an automotive vehicle having a propulsion engine, comprising:

a system for automatic actuation of an engageable and disengageable torque transmitting system;

at least one actuator for controlling at least one of the torque transmitting system and the transmission;

at least one control unit in signal transmitting communication with the at least one actuator; and at least one sensor for determining a position-representing variable of a position of at least one mobile transmission-internal gear shift element, the at least one transmission-internal gear shift element being controllable by the at least one actuator, a predetermined condition in the transmission being monitored as a function of time and the torque transmitting system being previously intentionally disengaged, the shifting being at least temporarily and at least partially undone at a specific duration with, at most, a small change in the position-representing variable and the torque transmitting system being temporarily engaged so that at least a slight torque is being transmitted, followed by a resumption of shifting.

8. The apparatus of claim 4, wherein the transmission comprises a moveable internal gear shifting element and wherein a second sensor determines a position-representing variable of the moveable internal gear shift element, moveable by at least one actuator during the shifting, and wherein, with previously intentionally disengaged torque transmitting system, during an automated shifting an excess of the force-representing variable is detected by comparison with a reference value, the position-representing variable being monitored as a function of time and the shifting being undone at least temporarily and at least partially when the reference value of the position-representing variable is exceeded and a specifiable time interval, with, at most, a small change in the position-representing variable, the torque transmitting system is at least so controlled for a short time that at least a slight torque is being transmitted and followed by the resumption of shifting.

9. The apparatus of claim 4, wherein after comparing the force-representing variable to a reference value as a function of time, the gear shifting is undone at least temporarily and at least partially when the force-representing variable exceeds the reference value during at least a specifiable time interval, the torque transmitting system is being engaged at least for a short time interval so that at least a slight torque is being transmitted, followed by a continuation of the gear shifting.

10. The apparatus of claim 7, wherein the value of the specific duration depends upon the value of the excess of the position-representing variable over a reference value.

11. The apparatus of claim 7, wherein the value of the specific time depends upon the gear to shift in the transmission.

12. The apparatus of claim 3, wherein the rotation of the transmission input shaft is being measured.

13. The apparatus of claim 1, comprising two actuators to control the shifting of the transmission.

14. The apparatus of claim 1, wherein the at least one actuator comprises a cylinder cam disposed within the transmission.

15. The apparatus of claim 1, wherein the at least one actuator comprises a cylinder cam disposed outside of the transmission.

16. The apparatus of claim 1, wherein the at least one actuator comprises an electric motor for controlling one of the torque transmitting system and the transmission.

17. The apparatus of claim 1, wherein the at least one actuator comprises an electromagnetic drive for controlling one of the torque transmitting system and the transmission.

18. The apparatus of claim 1, wherein the at least one actuator comprises a fluid-operated motor to control at least one of the torque transmitting system and the transmission.

19. The apparatus of claim 18, wherein the motor is one of hydraulic, hydrostatic, pneumatic and hydropneumatic motors.

20. The apparatus of claim 1, wherein a connection line between said at least one actuator and at least one of said transmission and said torque transmitting system comprises one of mechanical transfer means, a linkage, and a Bowden cable, a transfer line actuated by a pressurized fluid including hydraulic and pneumatic fluids.

21. The apparatus of claim 1, wherein the least one sensor is arranged to detect force furnished by the at least one actuator for shifting.

22. The apparatus of claim 1, wherein the at least one sensor is arranged to detect variations of at least one of electrical current and voltage as a signal proportional to a force and wherein the at least one actuator comprises an electrical drive.

23. The apparatus of claim 1, wherein the least one sensor is one of a pressure sensor, a force sensor and a distance sensor.

24. The apparatus of claim 1, wherein the control unit comprises first and second sub-units respectively arranged to control the torque transmitting system and the transmission.

25. The apparatus of claim 24, wherein said sub-units are integrated into each other.

26. The apparatus of claim 1, wherein the predetermined condition is a condition in which a gear shift results in an excessive actuator force.

27. The apparatus of claim 2, wherein the predetermined condition is a condition in which a gear shift results in an insufficient extent of said gear shifting elements change per time unit.

28. The apparatus of claim 26, wherein the predetermined condition is ascertained by comparing the excessive force with a reference value.

29. The apparatus of claim 27, wherein the predetermined condition is ascertained by comparing insufficient distance change per time unit to a reference value.

30. The apparatus of claim 1, wherein the torque transmitting system includes a clutch.

31. The apparatus of claim 1, further comprising at least one engine control in signal transmitting communication with the control unit and the propulsion unit.

32. The apparatus of claim 31, wherein the at least one engine control is a slip control.

33. The apparatus of claim 31, wherein the at least one engine control is a traction control.

34. The apparatus of claim 31, wherein the at least one engine control is an anti-locking control.

35. The apparatus of claim 1, further comprising an electronic clutch management system in signal transmitting communication with the control unit.

36. A method for controlling an automated engageable and disengageable torque transmitting system and shifting of an automatized transmission in a power train of an automotive vehicle having a prime mover, comprising the steps of:

upon recognizing the desire for shifting into a different gear, reducing the transmissible torque of the torque transmitting system to a specifiable, but variably selectable value of substantially zero;

initiating the gear shift process by a control unit; actuating transmission-internal shifting elements in a direction toward a neutral transmission position by at least one actuator;

selecting internal transmission shifting elements by the at least one actuator and actuating the internal transmission shifting elements in a direction toward an engaged gear position;

detecting at least one variable of the gear shift process as a function of time, the variable representing a force necessary for the gear shifting process;

comparing the at least one variable to a reference value;

stopping the gear shift process and undoing the actuation of the internal transmission gear shift elements at least partly during a short time interval when the at least one variable is higher than the reference value;

controlledly shifting at least for a short time interval to a different gear ratio than the desired one;

controlledly shifting the transmission to the desired gear ratio again;

engaging the torque transmitting system at least partly during a short time to effect at least a slight rotation of a transmission input shaft;

resuming the gear shift process.

37. The method of claim 36, wherein said resuming step is determined when the at least one force-representing variable exceeds a reference value during a specified time interval.

38. The method of claim 37, further comprising the steps of:

interrupting the gear shift process;

reversing the actuation of the internal transmission shift elements at least partly during a short time;

again engaging at least partly the torque transmitting system during a short time for obtaining at least a slight rotation of the transmission input shaft;

continuing thereafter the gear shift process until the new gear is shifted when the rate of change of the one variable representing a position drops below a reference value during a specified time.

39. The method of claim 38, further comprising the steps of:

interrupting the gear shift process;

reversing at least partly during a short time the actuation of the internal transmission shift elements;

engaging again at least partly the torque transmitting system during a short time to obtain at least a slight rotation of the transmission input shaft;

continuing the gear shift process thereafter until the new gear is shifted when the rate of change of the one variable representing a position drops below a reference value during a specified time and the one variable representing a force exceeds a reference value during a specified time.

40. The method according to claim 37, further comprising the step of sensing during automated shifting a variable representing the condition in the transmission.

41. The method according to claim 40, further comprising the steps of connecting the actuator to an electric motor and utilizing one of electric current and voltage of the electric motor as a force-representing signal.

42. The method according to claim 37, further comprising the step of utilizing a signal denoting a rotational speed of a rotary component of an electric motor on of the at least one actuator as a signal representing a position.

43. The method according to claim 37, further comprising the steps of storing and recalling the reference value from a memory.

44. The method according to claim 43, wherein the reference value is the same for all gear ratios.

45. The method according to claim 44, wherein the specified time interval is the same for all gear ratios.

46. The method according to claim 43, wherein the at least one reference value is selected as a function of the gear ratios engaged.

47. The method according to claim 46, wherein said specified time interval is selected as a function of the gear ratio to be engaged.

48. An apparatus for automated controlling of an automated transmission which is connected to a torque transmitting system by an input shaft, comprising:

a control unit; and at least one actuator in communication with said control unit and connected to said transmission for shifting into any one of a plurality of gears under predetermined conditions to undo, at least temporarily and at least partially, the preceding gear shifting, and to thereafter resume gear shifting.

* * * * *